July 18, 1933.  N. M. BAKER  1,918,954
GOGGLE
Original Filed Oct. 18, 1927
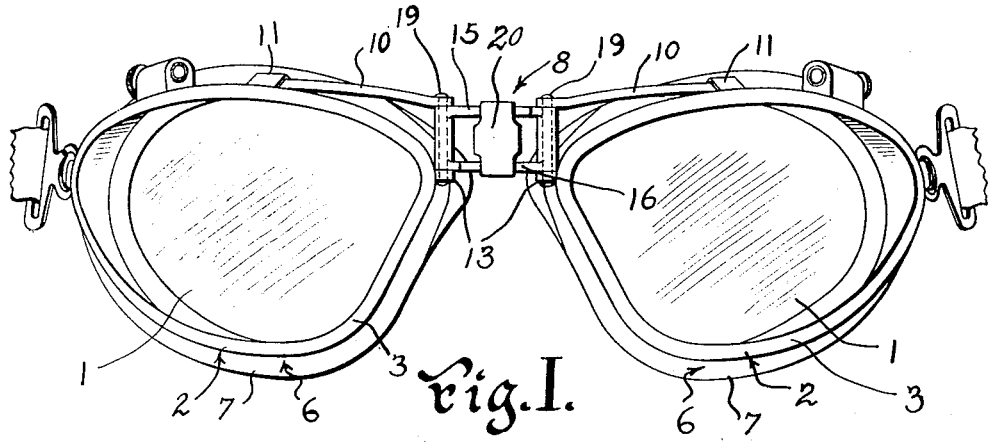
Fig. I.
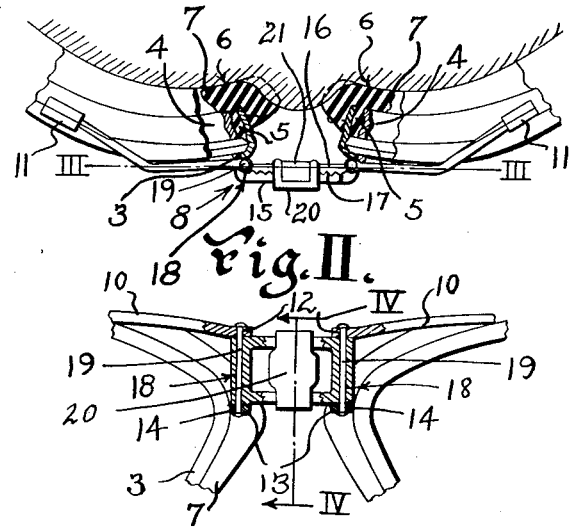
Fig. II.
Fig. III.
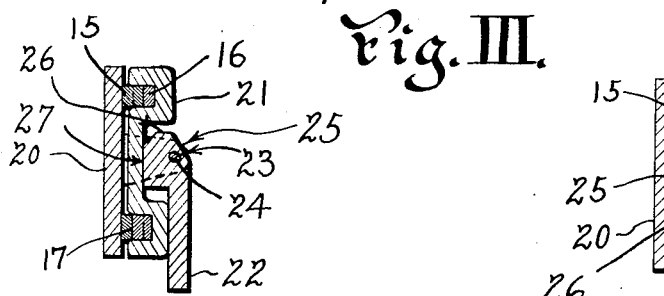
Fig. IV.
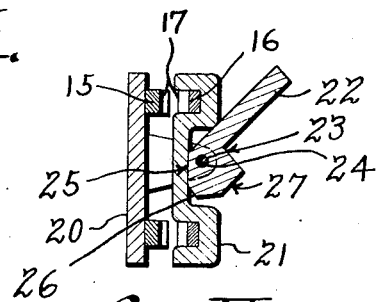
Fig. V.
INVENTOR
Nelson M. Baker.
BY
Harry H. Stye
ATTORNEY Patented July 18, 1933

1,918,954

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

GOGGLE

Original application filed October 18, 1927, Serial No. 226,900. Divided and this application filed August 27, 1930. Serial No. 478,151.

This invention relates to ophthalmic mountings, and has particular reference to a goggle adapted for the use of aviators.

This application is a division of my Patent Number 1,807,681, June 2, 1931.

The principal object of the invention is to provide a properly centered pair of lenses with adjustable means for holding them rigidly in proper relation to the eye of the wearer.

Another object of the invention is to provide a pair of wide vision lenses with means for holding them in place in proper relation to the eyes of the wearer.

Another object of the invention is to provide readily adjustable means that will hold the lenses in aligned position when adjusted to the facial requirements of the wearer.

Another object of the invention is to provide improved means for regulating the distance between the lenses and for locking the same rigidly to the regulated distance.

Another object of the invention is to provide adjustable means on the members connecting the two lenses that may be centered with respect to the two lenses after the distance between the same has been fixed.

Other objects and advantages of the invention will become apparent from the following description taken in connection with the accompanying drawing and it will be understood that many changes may be made in the arrangements and details of parts without departing from the spirit of the invention as set forth in the accompanying claims. I therefore, do not wish to be limited to the exact details shown and described, the preferred forms only having been shown by way of illustration.

Referring to the drawing:

Fig I is a front view of a goggle embodying the invention;

Fig. II is a fragmentary plan view of Fig. I;

Fig. III is a cross section on line 3—3 of Fig. II;

Fig. IV is a cross section on line 4—4 of Fig. III;

Fig. V is a view similar to Fig. IV showing the parts separated one from the other with the clamp member in open position.

Referring to the drawing in which similar characters of reference are used to denote corresponding parts throughout, a pair of lenses 1 are mounted in an eyecup frame 2 having a front flange or lens retaining seat 3 and an inner ring or rim 4 between which is held the flange 5 of the resilient face contacting member 6. The face contacting ring 6 has the enlarged portion 7 for engagement with the face and this ring is made preferably of soft rubber. The eyecups are secured one to the other by the bridge 8.

The bridge connection 8 comprises a pair of bridge bars 10 having one end fitting into a lug 11 on the frame or rim 2. These bridge bars 10, have an opening 12 on their outer ends for a pivotal connection. Lugs 13 are secured to each of the rims 2 and provided with a pivotal opening 14 as shown in Fig. III. A pair of interlocking arms 15 and 16 having serrated engaging faces 17 are provided with the pivot openings 18, one pivot opening in each arm adjacent the free end of the other arm.

These pivot arms are held in place by the pivot pins 19. The interlocking arms 15 and 16 are held between a pair of clamping plates 20 and 21, see Fig. IV and Fig. V. The clamping plate 21 is engaged by a pivoted cam lever 22 pivoted at 23 to the lug 24 on the clamp plate 20. The cam lever 22 is provided with three cam faces 25, 26 and 27 all of which provide varying degrees of clamping pressure. It will be seen that by the operation of the cam lever 22 the interlocking arms 15 and 16 may be locked in engaging position or may be separated to adjust the distance between the eyecups. When the interlocking arms 15 and 16 are set at the position giving the required distance between the eyecups the cam lever 22 is moved to an intermediate locking position by bringing the cam face 26 into engagement with the plate member 21. This exerts sufficient pressure on the plate member 21 to hold the serrated faces 17 together to prevent longitudinal movement of the arms 15 and 16 relative to each other and also permits the clamping means to be moved on said arms so that it can be centrally located with respect to the eyecups. The cam lever 22 is then pressed downwardly to bring the cam face 27 into engagement with the clamp plate 21. This forces the clamp plates 20 and 21 together to rigidly lock the parts in adjusted position.

It will be seen from the foregoing that the distance between the eyecups may be regulated by the serrated arms 15 and 16 and that the eyecups may be angled with respect to each other on the pivots 19 so that when the goggle is not in use the cups may be folded one on the other. This provides means for folding the eyecups with respect one to the other and for adjusting the distance between them.

From the foregoing description it will be seen that I have provided simple, efficient and economical means for carrying out all the objects of the invention and that I have provided ready and facile means whereby such a goggle may be adjusted to the facial requirements of the wearer and then lock the parts in such a way as to make them maintain this relationship and yet allow them to be folded for carrying when not in use.

Having described my invention I claim:—

1. In a device of the character described, a pair of lens holding members each having a relatively long pivot support capable of producing in effect two independent pivot bearings separated one from the other—a bridge member pivotally connected with each pivot support and overlying each other and slidable one on the other and operable means for clamping the two bridge members together as desired to regulate the distance between the two lens holding members, the bearings of said pivot supports being sufficiently long to prevent sagging of one lens holding member with respect to the other to maintain the alignment of the lenses in the lens holding members.

2. In a device of the character described, a pair of lens holding members each having a relatively long pivot support capable of producing in effect two independent pivot bearings separated one from the other, a bridge member pivotally connected with each pivot support and overlying each other and slidable one on the other, one of said members having a portion extending beyond the other, and a cam member pivoted on said extension to engage the other member, to lock the two members together at any desired distance between the lens holding members, the bearings of said pivots being sufficiently long to prevent sagging of one lens holding member with respect to the other to maintain the alignment of the lenses in the lens holding members.

NELSON M. BAKER.